United States Patent
Lee et al.

(10) Patent No.: US 11,003,664 B2
(45) Date of Patent: May 11, 2021

(54) EFFICIENT HYBRID PARALLELIZATION FOR IN-MEMORY SCANS

(71) Applicant: Oracle International Corporation, Redwood Shores, CA (US)

(72) Inventors: Teck Hua Lee, Newark, CA (US); Shasank Chavan, Menlo Park, CA (US); Chinmayi Krishnappa, San Mateo, CA (US); Allison Holloway, San Carlos, CA (US); Vicente Hernandez, Zapopan (MX); Dennis Lui, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1145 days.

(21) Appl. No.: 15/249,979

(22) Filed: Aug. 29, 2016

(65) Prior Publication Data

US 2018/0060399 A1  Mar. 1, 2018

(51) Int. Cl.
*G06F 16/2455* (2019.01)
*G06F 16/2453* (2019.01)

(52) U.S. Cl.
CPC .. *G06F 16/24561* (2019.01); *G06F 16/24532* (2019.01); *G06F 16/24542* (2019.01)

(58) Field of Classification Search
CPC ......... G06F 16/24532; G06F 16/24542; G06F 16/24561
See application file for complete search history.

(56) References Cited

U.S. PATENT DOCUMENTS

| | | | |
|---|---|---|---|
| 9,378,232 B2 | 6/2016 | Mukherjee et al. | |
| 9,430,390 B2 | 8/2016 | Mukherjee et al. | |
| 9,606,921 B2 | 3/2017 | Kamp et al. | |
| 9,684,682 B2 | 6/2017 | Mukherjee et al. | |
| 2005/0131881 A1* | 6/2005 | Ghosh | G06F 16/24532 |
| 2008/0163215 A1* | 7/2008 | Jiang | G06F 9/546 |
| | | | 718/100 |
| 2008/0263089 A1* | 10/2008 | Cousins | G06F 11/2069 |
| 2010/0169888 A1* | 7/2010 | Hare | G06Q 10/107 |
| | | | 718/102 |
| 2013/0155456 A1* | 6/2013 | Morrison | G06F 3/1288 |
| | | | 358/1.15 |
| 2016/0350371 A1 | 12/2016 | Das et al. | |

* cited by examiner

*Primary Examiner* — Van H Oberly
(74) *Attorney, Agent, or Firm* — Hickman Becker Bingham Ledesma LLP

(57) ABSTRACT

Techniques are described herein for hybrid parallelization of in-memory table scans. Work for an in-memory scan is divided into granules based on a degree of parallelism. The granules are assigned to one or more processes. The work for each granule is further parallelized by dividing the work granule into one or more tasks. The tasks are assigned to one or more threads, the number of which can be dynamically adjusted.

16 Claims, 6 Drawing Sheets

EFFICIENT HYBRID PARALLELIZATION FOR IN-MEMORY SCANS

FIELD OF THE INVENTION

The present invention relates to techniques for parallelizing database table scans.

BACKGROUND

Database systems typically store database objects (e.g., tables, indexes, etc.) on disk, and load data items from those database objects into volatile memory on an as-needed basis. Once loaded into volatile memory, the data items may remain cached in volatile memory so that subsequent accesses to the same data items will not incur the overhead of accessing a disk. Those data items may be replaced in cache, for example, to make room in volatile memory to store other data items that have been requested.

Rather than load individual data items on a per-item basis, entire database objects, or portions thereof, may be loaded into volatile memory. Various approaches for loading entire database objects, or selected portions thereof, into volatile memory to speed up query processing are described in U.S. patent application Ser. No. 14/377,179, entitled "Mirroring, In Memory, Data From Disk To Improve Query Performance," filed Jul. 21, 2014, referred to herein as the "Mirroring" application, the contents of which are incorporated herein in its entirety.

According to the approaches described in the Mirroring application, data objects, or portions thereof, are stored in volatile memory in a different format than the format that those same objects have on disk. For example, the in-memory version of an object may be in a column-major format, while the on-disk version may be stored in a row-major format.

Storing objects in volatile memory reduces the overhead of accessing data from a disk. However, operations such as a table scan still require a high processing cost. In-memory table scan performance may be improved by improving processing performance and CPU utilization.

Processing performance may be improved by parallelizing the work for an operation. Processing work may be parallelized by dividing the work into work granules and processing the work granules in parallel. Typically, work is divided and assigned to a number of processes during query initialization. Various approaches for dividing work into work granules and generating an execution plan are described in U.S. application Ser. No. 10/824,887, entitled "Compilation and Processing a Parallel Single Cursor Model," filed by Bhasker Ghosh, et al. on Apr. 13$^{th}$, 2004, and issued as U.S. Pat. No. 8,086,645 on Dec. 27$^{th}$, 2011.

However, the number of processes assigned to the query does not change during query processing. The system cannot adjust the resources being utilized in order to react to changing workloads. If the system workload becomes higher while the query is processing, the system cannot reduce the number of processes to allow other queries to run faster. Similarly, if another query finishes while the query is processing, the system cannot increase the number of processes to process the work faster.

Additionally, work within a work granule may be further parallelized based on the data required for each work granule. For example, a portion of a table may be stored in volatile memory. Each column of the table may be processed individually. However, when generating an execution plan for processing work in parallel, the system does not know what the structure of data stored in memory is like, in order to determine whether the work may be parallelized and how to divide the work granules.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are presented herein for hybrid parallelization of in-memory table scans. As described in the Mirroring application, data objects may be divided into portions and stored in in random access memory. Scanning the data object from random access memory is faster than accessing the data objects from a disk. In some embodiments, the data object portions are encapsulated in distinct In-Memory Compression Units (IMCUs). An IMCU is a columnar representation of a set of rows that are stored in region of persistent storage. In other embodiments, the in-memory representation of a data object portion may have other formats, including the same format in which the data is stored on disk.

According to one embodiment, when a database system receives a query, it generates an execution plan for the query. The database system determines a process-level degree of parallelism for the execution plan. The process-level degree of parallelism indicates how many processes to use for processing the query. The database system divides the work for the query into work granules based on the degree of parallelism. The work granules can be assigned to respective processes and processed in parallel with one another.

According to one embodiment, work for an in-memory scan may be divided into work granules based on the data stored in memory. For example, if a table to be scanned is divided into a plurality of IMCUs, each work granule may comprise scanning one or more IMCUs within the plurality of IMCUs.

The work for each work granule may be further parallelized by dividing the work granule into one or more tasks. The tasks may be assigned to one or more threads. As described in further detail below, the number of threads that are assigned to tasks within a work granule can be dynamically adjusted.

System Overview

Figure 1:
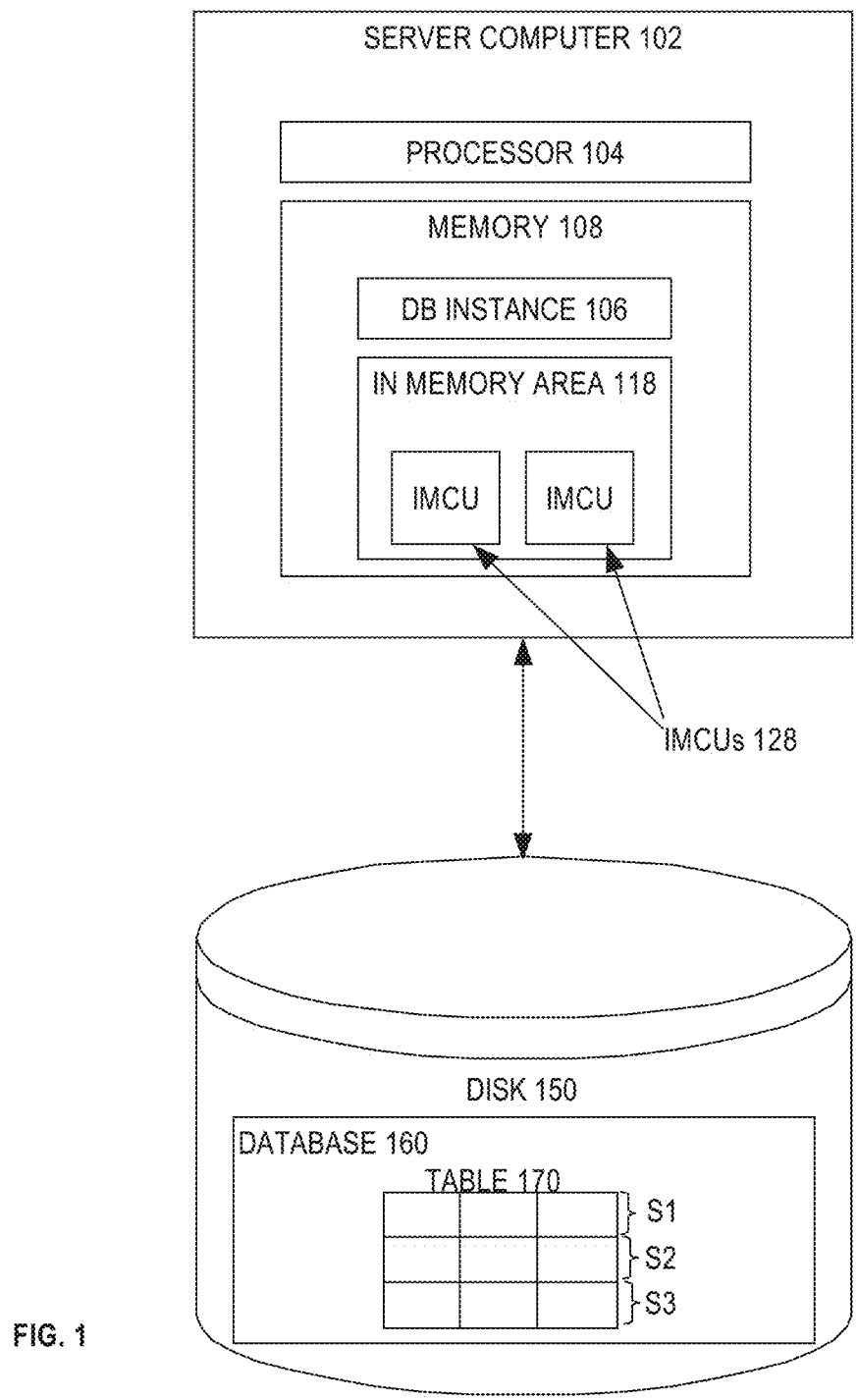
FIG. 1 is a block diagram illustrating in-memory compression units in a database system.

FIG. 1 is a block diagram of a database management system (DBMS) with in-memory column stores. For the purpose of illustration, the DBMS is shown as one database server computer 102, comprising one or more processors 104 and local memory 108. Database server computer 102 is executing one database server instance 106 coupled to a database 160 stored on a hard disk 150.

In alternative embodiments, the DBMS may comprise one or more database server computers each executing one or more database server instances coupled to a database stored on one or more shared disks. For example, while in the illustrated embodiment database server computer 102 is executing a single database server instance 106, in alternative embodiments, multiple database server computers may each execute a respective database server instance, wherein each database server computer is operatively coupled to the same shared disk.

IMCU Overview

As described in detail in the Mirroring application, data from a table may be stored in both columnar format in an in-memory column store and in row-major format on disk.

Referring to FIG. 1, the DBMS includes a dedicated in-memory column store, called the In-Memory Area 118, which acts as storage for columnar data. The in-memory area 118 is allocated from memory 108.

Columnar data is created and stored in the in-memory area 118 based on the on-disk row-major data. In the illustrated embodiment, the in-memory data is a columnar representation that includes contiguously allocated memory portions called In-Memory Compression Units (IMCUs 128).

Database 160 may include a table 170. Table 170 may comprise segments S1, S2, and S3, which may respectively comprise one or more contiguous (within an address space) series of on-disk blocks. Each segment may be stored as one or more IMCUs in memory. An IMCU may represent a range of rows from table 170, stored in columnar format. Each of IMCUs 128 may correspond to a distinct range of rows from a particular column or set of columns.

For the purpose of illustration, individual segments are stored as IMCUs. However, entire table partitions or entire tables may be divided into one or more IMCUs. According to one embodiment, partitions and sub-partitions of a partitioned table are organized into IMCUs independently of each other, and an IMCU does not span multiple partitions. A single partition can, however, have multiple IMCUs.

Figure 2:
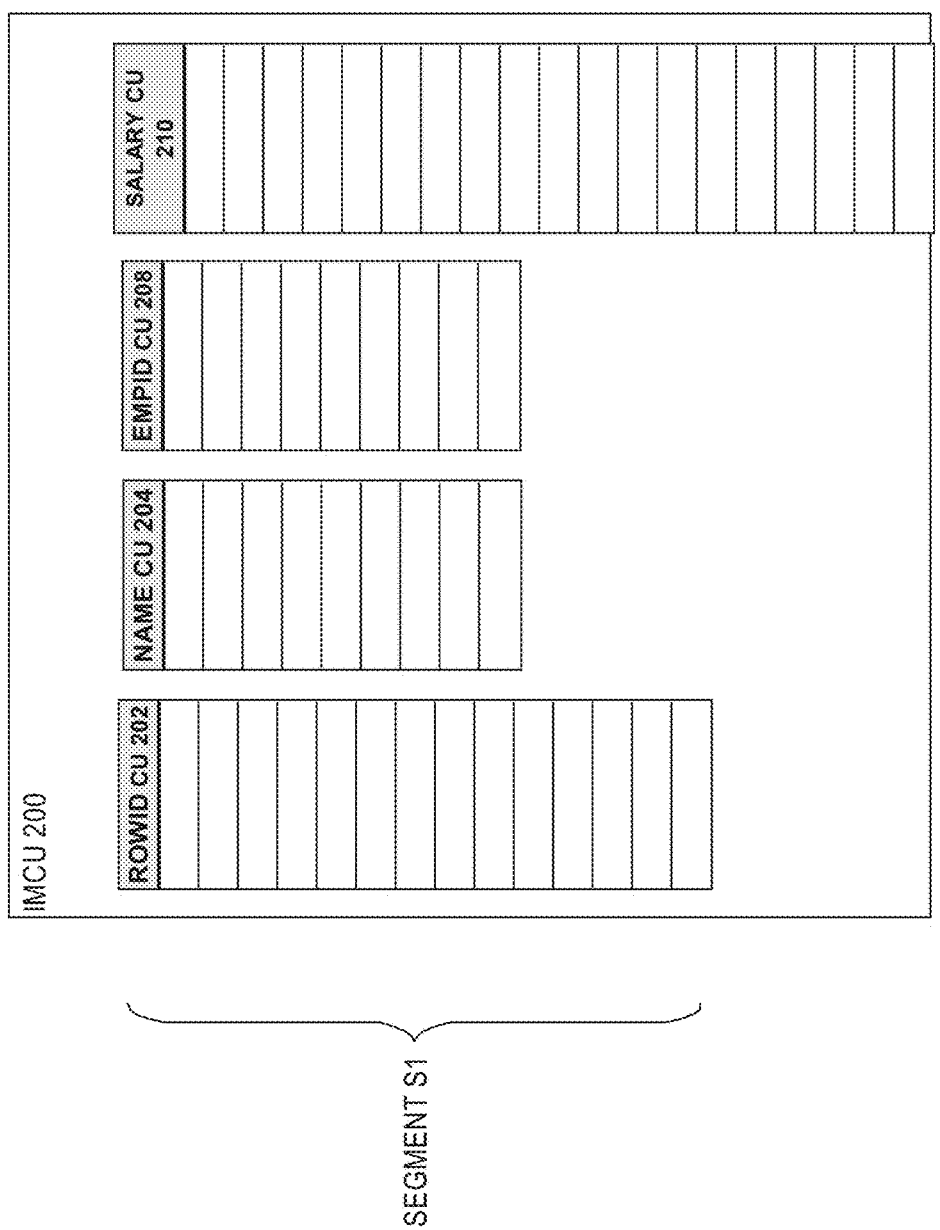
FIG. 2 is a block diagram illustrating column units within an in-memory compression unit, according to an embodiment.

Referring to FIG. 2, it is a block diagram illustrating an IMCU 200 in greater detail, according to an embodiment. In the illustrated embodiment, IMCU 200 contains items extracted from a set of rows of a table, such as table 170. IMCU 200 is stored in in-memory area 118, while table 170 is stored on disk 150. IMCU 200 stores rows from segment S1 of table 170.

Within IMCU 200, items from each column of table 170 are stored separately and contiguously as a column Compression Unit (CU). For the purpose of illustration, assume table 170 comprises columns "rowid," "name," "empid," and "salary." IMCU 200 includes CU 202, CU 204, CU 206, and CU 208 that respectively contain items from columns "rowid," "name," "empid," and "salary" of table 170.

In some embodiments, multiple database server instances operate as a shared-disk cluster, where the database server instances run on different nodes but access a common database. While the on-disk data is shared, each node may have its own private in-memory area that is accessible only to that node's instance. IMCUs may be distributed and stored in the in-memory area of different nodes. An IMCU may be accessible only by the node it is stored on.

In-Memory Scan

An in-memory scan refers to the operation of obtaining at least some of the data items that satisfy a query from the in-memory data in in-memory area 118, rather than from persistent storage 150.

According to one embodiment, an in-memory scan starts by locating the IMCUs that contain the required rows. Within each IMCU, it is typically only necessary to look at less than all the columns in a CU.

According to one embodiment, each CU has an in-memory storage index that contains the minimum and maximum column values for all rows in that CU. The storage index may be used to prune CUs using predicates on the column. Even if a CU is not pruned, certain predicates are more efficiently calculated on compressed data compared to the SQL execution engine. Thus, in some embodiments, the database server pushes down many types of predicates to the in-memory scan. For example, predicates such as SUM, AVERAGE, COUNT, MIN, MAX that only operate on a single table may be calculated during the in-memory scan.

Execution Plan

To execute a query, a DBMS first generates a query execution plan. An execution plan generated by a DBMS defines operations to be performed to execute a query and an order for performing the operations, known as plan operations. A DBMS may execute the execution plan as a distributed operation. The execution plan divides plan operations into work granules, some of which may be executed in parallel by a plurality of processes. In an embodiment, if plan operations are executed in serial by a single processor, the execution plan only comprises a single work granule.

An execution plan generated for an in-memory table scan includes one or more work granules that scan rows that are stored in memory. In an embodiment, a work granule may comprise scanning the rows, decompressing compressed data, and evaluating pushed-down predicates. A work granule may also comprise computing aggregates, join operations, group-by operations, or other CPU intensive work.

In some embodiments, when a query is received by a database server instance, the work of the query may be parallelized by distributing the work to multiple processes according to the query execution plan. In a clustered database system, the query may be received by a single node, but then the work of the query may be distributed to multiple nodes in the cluster according to the query execution plan.

During parallel execution of a query, every SQL operation in the execution plan is divided into tasks and assigned to different processes. In particular, the scan operation may be parallelized by dividing the work of scanning a table into work granules that correspond to different portions of a table. Each work granule is assigned to a different target process.

In an embodiment, work granules may be determined based on the IMCUs for a table. A table scan comprises scanning a plurality of on-disk data blocks, or a corresponding plurality of IMCUs stored in memory. Each IMCU can be scanned separately, so a work granule can comprise one or more IMCUs. Additionally, each IMCU may be a different size. Work granules may comprise any number of IMCUs and the amount of work in each work granule may differ based on the number of IMCUs and the size of each IMCU.

In a clustered database system, the work granules may be based on the IMCUs stored in local memory at each node. Since an IMCU stored in the local memory of a node is only accessible to processes running on the same node, work that targets the IMCU must be assigned to that node.

For example, database server instance 106 responds to scans that target data from table 170 by breaking the scan operation into work granules based on IMCUs 128. For example, assume that database server instance 106 receives a query that includes a scan of table 170. In response, database server instance 106 may create a first set of work granules corresponding to the IMCU(s) for segment S1, a second set of work granules corresponding to the IMCU(s) for segment S2, and a third set of work granules corresponding to the IMCU(s) for segment S3. For the purpose of illustration, each work granule comprises the scan for a segment of table 170.

The number of processes assigned to a SQL operation is called the process-level degree of parallelism. During query initialization, a user may specify a process-level degree of parallelism, or the database system may determine a number of processes to use for the operation. A user may specify a degree of parallelism by selecting a previously generated execution plan that specifies a degree of parallelism. In an embodiment, the database system determines the availability of processes when generating an execution plan and determines a degree of parallelism for the execution plan.

Lightweight Threads

A database process may comprise state objects that indicate state information for the process and allows the DBMS to manage and track the process. A typical database thread may also comprise a state object. A state object is a resource that is visible to the DBMS and indicates to the DBMS the state of the process or thread. For example, a state object may indicate whether a process is free, unavailable, or failed. Thus, the DBMS can use the state object to determine how many processes are running in the database system, which ones are available, and clean up failed processes.

In an embodiment, the DBMS comprises a resource manager, which handles database processes and threads for the database system. The resource manager may be a background daemon, a database component, software module, or some combination thereof. The resource manager may monitor database instance(s) and track CPU and I/O resources across database processes. In an embodiment, the resource manager is a process scheduler that interrupts, de-schedules, schedules, or otherwise controls when database processes may run.

In an embodiment, state objects are used by the resource manager to track the current state of database processes. As used herein, a state can include information regarding a database process, login credentials for a database session, current database transactions, and resources held by a process or thread. Examples of state objects include process, session, and call state objects. Process state objects keep a process' information, attributes (such as dead, system process, fatal system process, cleanup process, shared server, and etc.), and other process structures such as a process interrupt queue.

Tracking the current state of processes allows the DBMS to perform cleanup and ensure system states and attributes are correct and that system resources are released when they are not needed. A wrong system state may cause issues for the DBMS. For example, a wrong number of processes may result in performance issues. Resource leaks may cause performance degradation or system hangs. Therefore, state object cleanup involves updating the system and releasing resources.

Some state objects are required for doing certain operations. For example, a state object is required to get a lock for a database object or resource.

Both a database process and a database thread take time to spawn and require additional resources in order to create and maintain a state object. A database process may spawn a type of thread known as a "lightweight thread." A lightweight thread does not include a state object and may be spawned, put to sleep, and woken faster than a database thread or database process.

Since lightweight threads do not include a state object, the database system cannot track or manage the lightweight thread. The database system does not know how many lightweight threads are running, whether any have failed, or whether any are available. Instead, lightweight threads are managed by the database process that spawned it. Each lightweight thread may share resources from its parent database process and communicate with the parent database process.

In an embodiment, a resource manager communicates with the parent database process of one or more lightweight threads in order to manage the one or more lightweight threads. A database process may request permission from the resource manager to run one or more lightweight threads. The resource manager may determine whether the process has permission to run the one or more lightweight threads. In an embodiment, the resource manager determines how many lightweight threads a process may run based on the amount of CPU utilization in the database system. For example, the resource manager may be configured to leave half of the system available for incoming work. Thus, if the system can run a maximum of 5000 threads, the resource manager may only allow 2500 threads to run at one time. In the present example, if the system is running 2450 threads and the process requests to run 10 threads, then the resource manager will grant permission for the process to run the threads. If the process requests to run 60 threads, then the resource manager may only grant permission for the process to run 50 threads. If 2500 threads are already running, then the resource manager may deny the process' request. The process may wait a period of time before re-requesting permission to run a number of lightweight threads.

In an embodiment, the resource manager tracks the number of lightweight threads running in the database system based on the number of requests it has received. Each lightweight thread may run for a pre-determined amount of time, referred to herein as a "quantum." When a resource manager grants permission for a number of threads to run, it may assume that the number of threads will run immediately and that they will be done after a quantum. After a quantum has passed, it may assume that the lightweight threads finished running.

A work granule may comprise one or more tasks. Work for an in-memory scan operation may be further parallelized by assigning a lightweight thread to each of the one or more tasks. The number of lightweight threads assigned to a SQL operation is called the thread-level degree of parallelism.

In an embodiment, the work for a work granule may be divided into tasks based on IMCUs. For example, if a work granule includes scanning two IMCUs, a first task may be for scanning the first IMCU and a second task may be for scanning the second IMCU. Each task may be assigned to a lightweight thread for processing. In an embodiment, if an IMCU comprises a plurality of CUs, the work for scanning the IMCU may be further divided into tasks corresponding to each CU in the plurality of CUs. Each CU may be scanned by a respective lightweight thread. Additionally, a task may comprise scanning a distinct set of rows from within an IMCU.

In some embodiments, a process that is assigned a work granule determines one or more tasks for the work granule. When an execution plan is generated or when work granules are determined, information regarding the structure of individual IMCUs is unavailable to the DBMS. The DBMS may not know how database objects are stored in IMCUs, how IMCUs correspond to work granules, or what columns are stored in an IMCU. Additionally, an IMCU may comprise compressed data, and the DBMS may not know how the data is compressed. Compressed data may require more work, and the processes may divide the work granule into tasks based in part on the amount of work required for each task. For example, a table scan comprises scanning a plurality of on-disk data blocks. The DBMS may generate work granules by dividing work for scanning the plurality of on-disk data blocks. After a work granule is assigned to a process, the process may determine which IMCUs correspond to on-disk data blocks that it needs to scan. The process may determine, based on the IMCUs, how to divide the work granule into one or more tasks that may be processed in parallel.

Hybrid Parallelization Process

By assigning the work within a work granule to one or more lightweight threads, the work for an in-memory scan is further parallelized. The process-level degree of parallelism remains the same throughout execution of the execution plan. However, the thread-level degree of parallelism is dynamically adjusted. The combination of a static process-level degree of parallelism and a dynamic thread-level degree of parallelism is referred to as "hybrid parallelization."

The DBMS can dynamically adjust the thread-level degree of parallelism by adjusting the number of threads that are running at each process, based on the workload of the database system. If the DBMS is processing a large amount of work, it can reduce the number of threads running for each query. If the DBMS finishes processing a first query, it can allocate more threads for a second query that has work remaining.

Figure 3A:
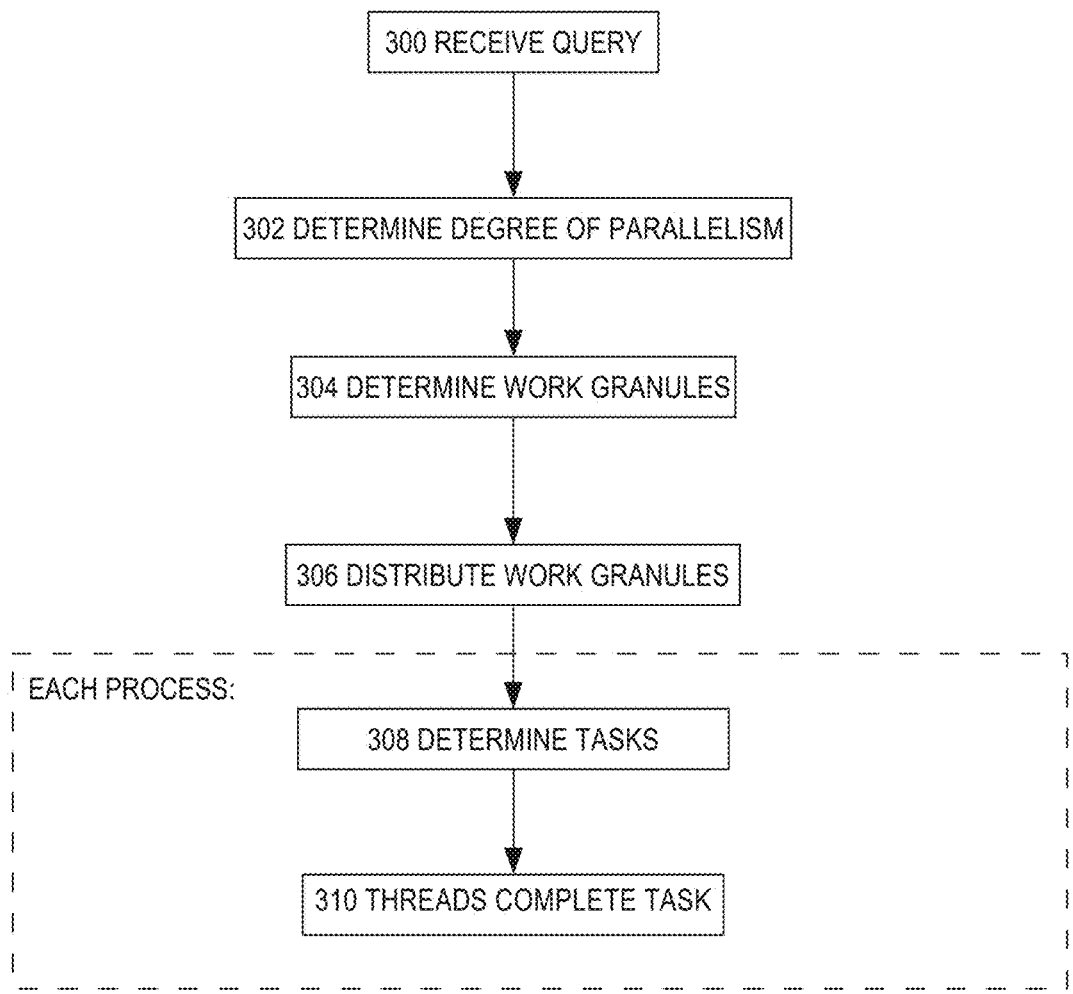
FIG. 3A is a flowchart illustrating steps for generating and executing an execution plan for an in-memory table scan.

Referring to FIG. 3A, it is a flowchart that illustrates steps performed by a DBMS to perform hybrid parallelization of an in-memory scan. At step 300, a database server instance receives a query. For the purpose of illustration, assume that the query received at step 300 is:

SELECT rowid, name FROM emp WHERE salary >200

An execution plan for the query may include a table scan that obtains data from memory. The execution plan may push-down the computation for the predicate, "WHERE salary >200," to the in-memory table scan.

At step 302, the database server instance determines a process-level degree of parallelism for the execution plan. The execution plan may process the query in serial, using only one process, or it may parallelize the work based on a desired degree of parallelism. A user may specify a degree of parallelism for the execution plan, or the database server instance may determine a degree of parallelism for the execution plan.

In an embodiment, the database server instance determines, based on the DBMS workload, a degree of parallelism for the query. The DBMS may comprise a resource manager, which tracks and manages database processes. The resource manager may determine a number of processes that may be used to process the received query, based on the number of process already running in the database system. Any number of workload management techniques may be used to determine a number of processes that may be used for the received query. For example, the resource manager may choose to assign only a portion of the available processes to calculating the query. The resource manager may keep half of a total number of processes free, and allocate a number of processes for the query from the remaining half of the total number of processes.

At step 304, the database server instance determines one or more work granules for the execution plan, based on the degree of parallelism. In an embodiment, a work granule is generated for each processor that is available to process the query. In other words, the number of work granules corresponds to the degree of parallelism. Each work granule may comprise a scan of one or more IMCUs. In an embodiment, the work granules are determined based on the IMCUs for a table. Work granules may comprise any number of IMCUs and the amount of work in each work granule may differ. The number of work granules for each processor varies, and the amount of work within each granule may also differ.

For the purpose of illustration, assume the columns "rowid," "name," and "salary" of the "emp" table are stored in six IMCUs 410, 420, 430, 440, 450, and 460. Each of IMCU 410, 420, 430, 440, 450, and 460 may comprise one or more rows for a column. The work for the query comprises scanning each of the IMCUs. The work may also include column decompression, decryption, predicate evaluation, and aggregate computation.

In the present example, the work may include calculating the predicate "WHERE salary >200" and returning only the rows that satisfy the predicate.

Figure 4B:
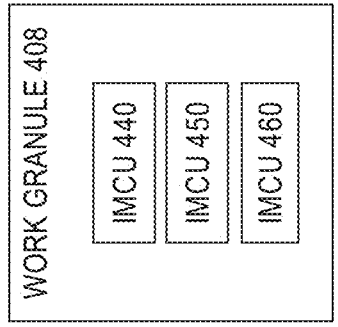
FIG. 4B is a block diagram illustrating work granules for a parallel table scan.
Figure 4B:
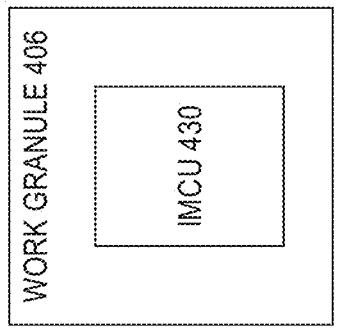
Figure 4B:
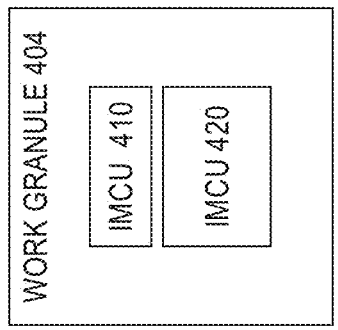
Figure 4A:
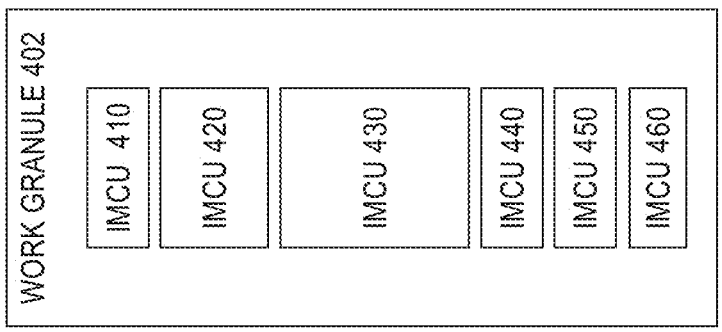
FIG. 4A is a block diagram illustrating a work granule for a serial table scan.

Referring to FIG. 4A, it is a block diagram illustrating a work granule for serial processing, in an embodiment. Since the work is processed by a single processor, there is a single work granule 402. Work granule 402 includes work for scanning IMCU 410, 420, 430, 440, 450, and 460.

Referring to FIG. 4B, it is a block diagram illustrating multiple work granules for parallel processing, in an embodiment. For the purpose of illustration, assume the degree of parallelism for the query is three. The work for scanning the plurality of IMCUs is divided between three work granules, work granule 404, work granule 406, and work granule 408. Work granule 404 includes the work for scanning IMCU 410 and 420. Work granule 406 includes the work for scanning IMCU 430. Work granule 408 includes the work for scanning IMCU 440, 450, and 460.

In a clustered database system, database objects may be divided and distributed among nodes of the cluster. For example, an IMCU may be stored in memory of particular nodes in the database system. The work granules may be determined based on which IMCUs are stored in memory on which nodes.

At step 306, the database server instance executes the execution plan by assigning the work granules to one or more respective processes. Each work granule is assigned to a process.

If the scan is being processed in serial, then the work granule(s) are assigned to a single process. Referring to FIG. 4A, work granule 402 is assigned to a single process.

If the scan is being processed in parallel, then the work granules are assigned to a number of processes equal to the degree of parallelism. Referring to FIG. 4B, work granules 404, 406, and 408 are each assigned to a respective process. In an embodiment, if the database system is a clustered database system, each work granule may be assigned to a different node in the cluster.

At step 308, for each process, one or more tasks are determined for the respective work granules. As described above, the work granule is divided into a plurality of tasks. Each IMCU within the work granule may correspond to a task. Additionally, each column within an IMCU may also correspond to a task. In an embodiment, each process determines a respective one or more tasks based on the IMCUs that correspond to the work granule assigned to the process. For example, a process may determine how many IMCUs correspond to a work granule and whether columns within an IMCU may be processed in parallel. Additionally, a process may determine tasks based on a level and/or type of compression for data stored within an IMCU. For example, a task may comprise decompressing an IMCU stored at a first compression level, and another task may comprise decompressing an IMCU stored at a different compression level.

At step 310, one or more threads at each process complete the one or more tasks for the respective work granule. In an embodiment, the number of threads used at the process is determined by the resource manager. The process may request a number of threads based on the number of tasks in the work granule. For example, referring to FIG. 4B, work granule 404 comprises a scan of IMCU 410 and 420. Work granule 404 can be divided into two tasks: a scan of IMCU 410 and a scan of IMCU 420. A process assigned to work granule 404 may request two threads, one for each task. The resource manager indicates whether the process can spawn the requested number of threads or indicates a different number of threads to the process.

In an embodiment, the process determines whether threads are available based on the number of allowed threads indicated by the resource manager, and the number of threads the process is currently running. If the process is not allowed to run more threads, then the process waits until a thread finishes its work before assigning a thread to the next task. When a thread finishes a task, it picks up another task, if any remain. The thread requests permission from the resource manager to run.

In an embodiment, the process periodically requests additional threads from the resource manager, based on the number of tasks remaining. The resource manager may increase or reduce the number of threads based on the workload of the database system.

For example, referring to FIG. 4A, assume work granule 402 is divided into six tasks, and the process assigned to work granule 402 was allowed to run three threads. When the three threads are each assigned a task and run, three tasks remain. The process may indicate to the resource manager that it has three tasks remaining and request three threads for the remaining tasks. Based on the workload of the database system, the resource manager indicates a number of threads, up to three, that the process may run. In the present example, assume the resource manager indicates the process can only have one thread. The process would wake a thread and assign it to the next task, and two additional tasks would remain. The process periodically re-checks to see if it can assign more threads to the remaining tasks.

Figure 3B:
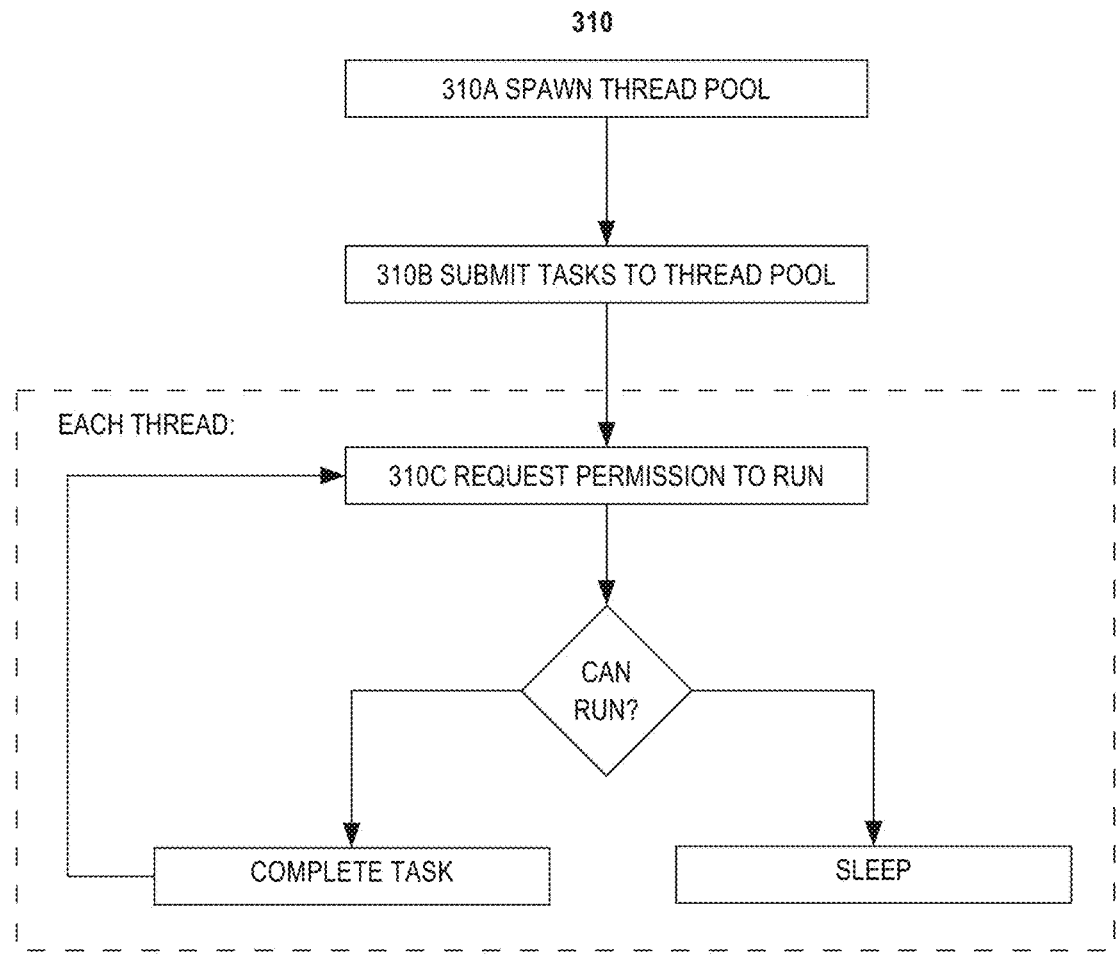
FIG. 3B is a flowchart illustrating steps for completing tasks using a thread pool.

In an embodiment, rather than assigning threads to tasks, each process spawns a pool of threads. Threads from each thread pool acquire tasks and attempt to complete the acquired task. Referring to FIG. 3B, it is a flowchart illustrating steps for completing tasks using a thread pool.

At step 310A, the process spawns a thread pool comprising a plurality of threads. In one embodiment, each process spawns a plurality of threads prior to receiving the work granule. The threads may be put to sleep so they do not consume any computing resources. When a process receives a work granule, a number of threads from the plurality of threads are woken to process tasks for the work granule.

At step 310B, the one or more tasks are submitted to the thread pool. Threads from the thread pool may acquire a task to complete.

At step 310C, each thread requests permission from the resource manager prior to running. If the thread receives permission to run, it may run for a specified amount of time before re-requesting permission. If the thread does not receive permission to run, then it may be put to sleep or wait and re-request permission to run. The resource manager may track the number of threads that have been granted permission to run, to determine how many threads are running across all processes. The resource manager may permit or deny requests to run, based on the number of threads that are currently running.

Once a thread completes a task, it checks to see whether any additional tasks are remaining. If tasks remain for a work granule, one or more available threads can be assigned to the remaining tasks. Step 310C is repeated until all tasks for every work granule have been completed.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
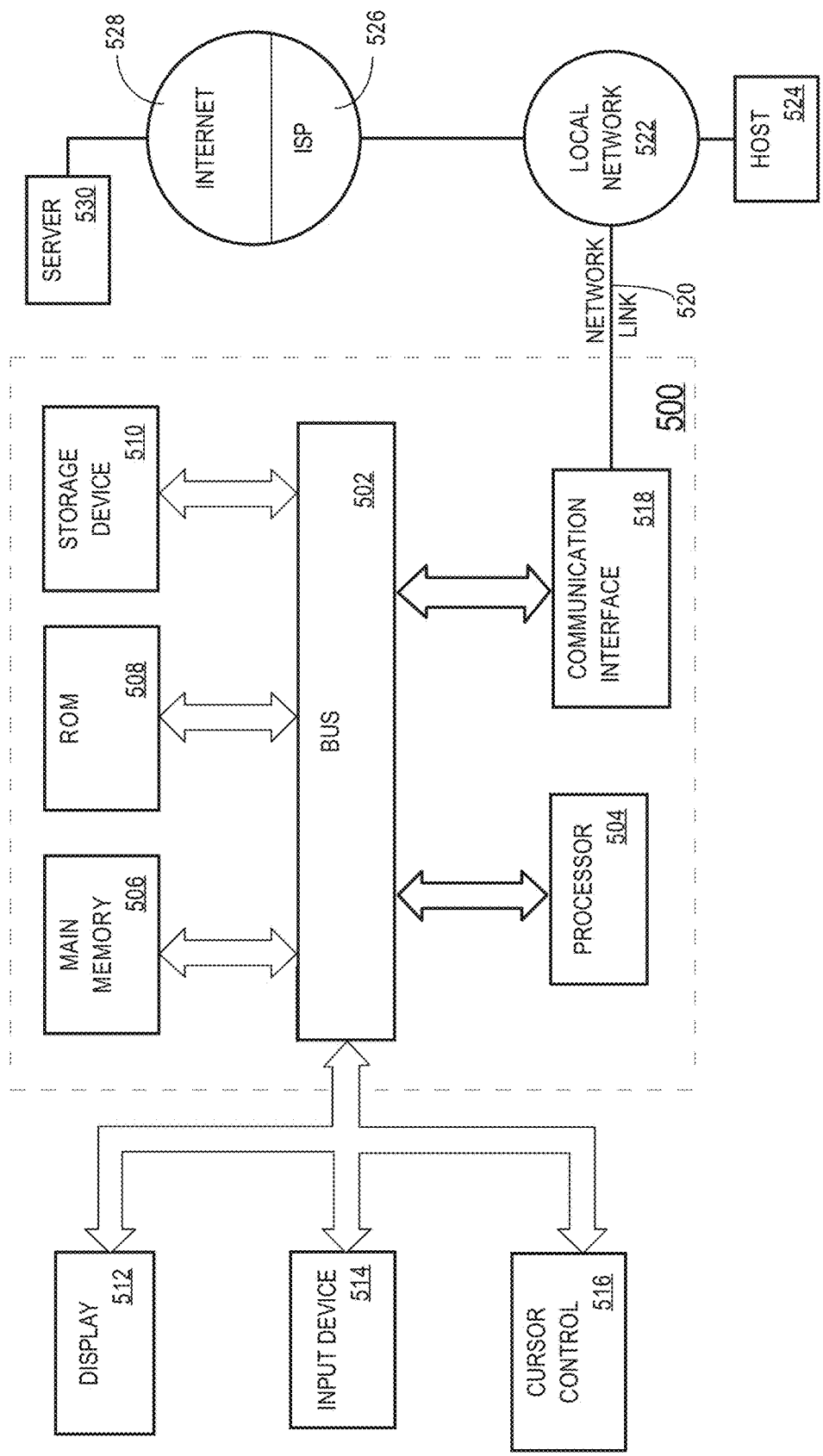
FIG. 5 is a block diagram illustrating a computer system upon which embodiments of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
a database management system (DBMS) generating an execution plan for executing a query, wherein generating an execution plan comprises:
determining a process-level degree of parallelism for said execution plan;

based on the process-level degree of parallelism, determining a number of processes of a set of processes to execute said execution plan, said number of processes including a plurality of processes;
determining a plurality of work granules to assign to said plurality of processes;
the DBMS executing said execution plan, wherein executing said execution plan includes:
for each process of said plurality of processes, assigning a respective work granule of said plurality of work granules to said each process;
each process of said plurality of process;
determining a number of tasks for the respective work granule assigned to said each process;
determining a respective first number of threads to execute the respective work granule assigned to said each process;
sending a request for the respective first number of threads to a resource manager of the DBMS;
receiving a response to said request that is from said resource manager indicating a second respective number of threads;
spawning said respective second number of threads; and
assigning each thread of said respective second number of threads spawned by said each process to execute a task of said number of tasks determined for the respective work granule assigned to each process.

2. The method of claim 1, wherein determining the plurality of work granules is based on a set of one or more in-memory database objects.

3. The method of claim 2, wherein a work granule of said plurality of work granules comprises scanning one or more in-memory database objects in the set of one or more in-memory database objects.

4. The method of claim 3, wherein a work granule of said plurality of work granules further comprises at least one of: decompressing compressed data, decrypting encrypted data, evaluating one or more predicates, or computing one or more aggregates for the query.

5. The method of claim 2, wherein the in-memory database objects are stored in a format different from an on-disk format.

6. The method of claim 1, further comprising:
for the particular process of said plurality of processes, periodically determining a third number of threads within said particular process to execute the respective work granule of said particular process.

7. The method of claim 6,
wherein for the particular process of said plurality of processes, the second respective number of threads is smaller than the respective first number of threads; and
further comprising increasing a number of threads within said particular process to execute the respective work granule of said particular process.

8. The method of claim 6, further comprising:
said particular process increasing a number of threads to execute the respective work granule assigned to said particular process.

9. One or more non-transitory computer-readable media storing sequences of one or more instructions that, when executed by one or more hardware processors, cause;
a database management system (DBMS) generating an execution plan for executing a query, wherein generating an execution plan comprises:
determining a process-level degree of parallelism for said execution plan;
based on the process-level degree of parallelism, determining a number of processes of a set of processes to execute said execution plan, said number of processes including a plurality of processes;
determining a plurality of work granules to assign to said plurality of processes;
the DBMS executing said execution plan, wherein executing said execution plan includes:
for each process of said plurality of processes, assigning a respective work granule of said plurality of work granules to said each process;
each process of said plurality of processes;
determining a number of tasks for the respective work granule assigned to said each process;
determining a respective first number of threads to execute the respective work granule assigned to said each process;
sending a request for the respective first number of threads to a resource manager of the DBMS;
receiving a response to said request that is from said resource manager indicating a second respective number of threads;
spawning said respective sound number of threads; and
assigning each thread of said respective second number of threads spawned by said each process to execute a task of said number of tasks determined for the respective work granule assigned to each process.

10. The one or more non-transitory computer-readable media of claim 9, wherein determining a plurality of work granules is based on a set of one or more in-memory database objects.

11. The one or more non-transitory computer-readable media of claim 10, wherein the work granule of said plurality of work granules comprises scanning one or more in-memory database objects in the set of one or more in-memory database objects.

12. The one or more non-transitory computer-readable media of claim 11, wherein a work granule of said plurality of work granules comprises at least one of: decompressing compressed data, decrypting encrypted data, evaluating one or more predicates, or computing one or more aggregates for the query.

13. The one or more non-transitory computer-readable media of claim 10, wherein the in-memory database objects are stored in a format different from an on-disk format.

14. The one or more non-transitory computer-readable media of claim 9, the sequence of one or more instructions including instructions that, when executed by said one or more processors cause for a particular process of said plurality of processes, periodically determining a third number of threads within said particular process to execute the respective work granule of said particular process.

15. The one or more non-transitory computer-readable media of claim 14, wherein:
for the particular process of said plurality of processes, the second respective number of threads is smaller than the respetive first number of threads;
the sequence of one or more instructions including instructions that, when executed by said one or more processors cause increasing a number of threads within said particular process to execute the respective work granule of said particular process.

16. The one or more non-transitory computer-readable media of claim 14, the sequence of one or more instructions including instructions that, when executed by said one or more processors cause said particular process increasing a number of threads to execute the respective work granule assigned to said particular process.

\* \* \* \* \*

UNITED STATES PATENT AND TRADEMARK OFFICE
CERTIFICATE OF CORRECTION

PATENT NO. : 11,003,664 B2  
APPLICATION NO. : 15/249979  
DATED : May 11, 2021  
INVENTOR(S) : Lee et al.

Page 1 of 1

It is certified that error appears in the above-identified patent and that said Letters Patent is hereby corrected as shown below:

In the Specification

In Column 5, Line 46, delete "clean up" and insert -- cleanup --, therefor.

In the Claims

In Column 13, Line 12, in Claim 1, delete "process;" and insert -- processes: --, therefor.

In Column 13, Line 47, in Claim 6, delete "the" and insert -- a --, therefor.

In Column 13, Line 64, in Claim 9, delete "cause;" and insert -- cause: --, therefor.

In Column 14, Line 15, in Claim 9, delete "processes;" and insert -- processes: --, therefor.

In Column 14, Line 26, in Claim 9, delete "sound" and insert -- second --, therefor.

In Column 14, Line 38, in Claim 11, delete "the" and insert -- a --, therefor.

In Column 14, Line 62, in Claim 15, delete "respetive" and insert -- respective --, therefor.

Signed and Sealed this  
Tenth Day of August, 2021

Drew Hirshfeld  
*Performing the Functions and Duties of the  
Under Secretary of Commerce for Intellectual Property and  
Director of the United States Patent and Trademark Office*